J. STUBBS.
Road-Scraper.

No. 199,756.  Patented Jan. 29, 1878.

Attest:
A. McCallum
D. G. Stuart

Inventor:
Jesse Stubbs
By W. B. Richards,
Atty.

UNITED STATES PATENT OFFICE.

JESSE STUBBS, OF MOUNT PLEASANT, IOWA.

IMPROVEMENT IN ROAD-SCRAPERS.

Specification forming part of Letters Patent No. 199,756, dated January 29, 1878; application filed November 22, 1877.

*To all whom it may concern:*

Be it known that I, JESSE STUBBS, of Mount Pleasant, in the county of Henry and State of Iowa, have invented certain new and useful Improvements in Road-Scrapers; and I do hereby declare that the following is a full, clear, and exact description thereof, which will enable others skilled in the art to which it appertains to make and use the same, reference being had to the accompanying drawings, and to letters of reference marked thereon, which form a part of this specification.

The nature of this invention relates to improvements in road-scrapers of that class in which a scraper-box is journaled to a front draft-frame and rear lever-handle frame, carrying wheels; and the invention consists in improvements in connecting the scraper-box to said frames, and, further, in improvements in locking the scraper-box to the rear frame, and in the use of a stop to hold the box from dropping at its rear end when loaded, all as hereinafter fully described, and set forth in the claims hereto annexed.

Figure 1:
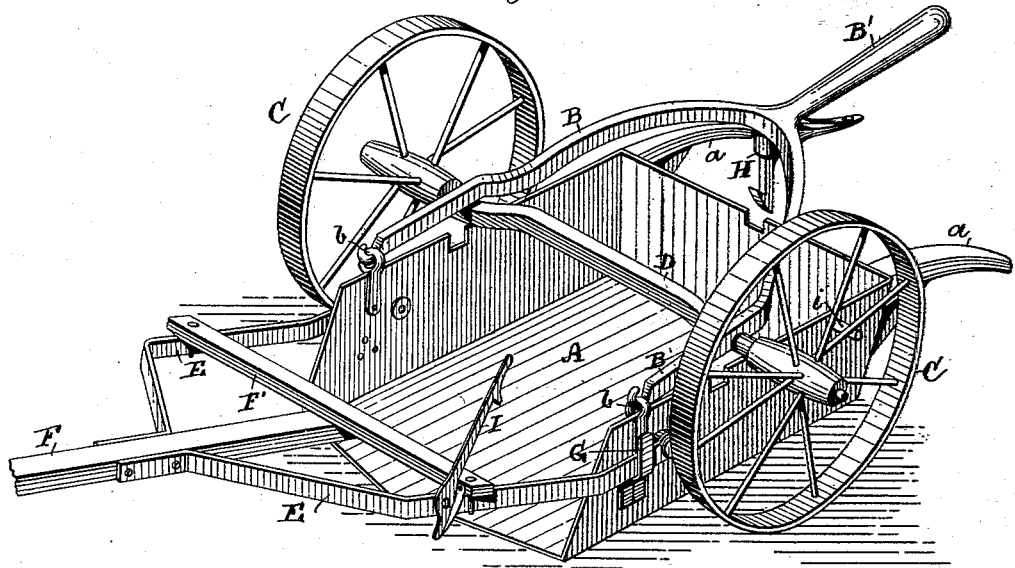
Figure 2:
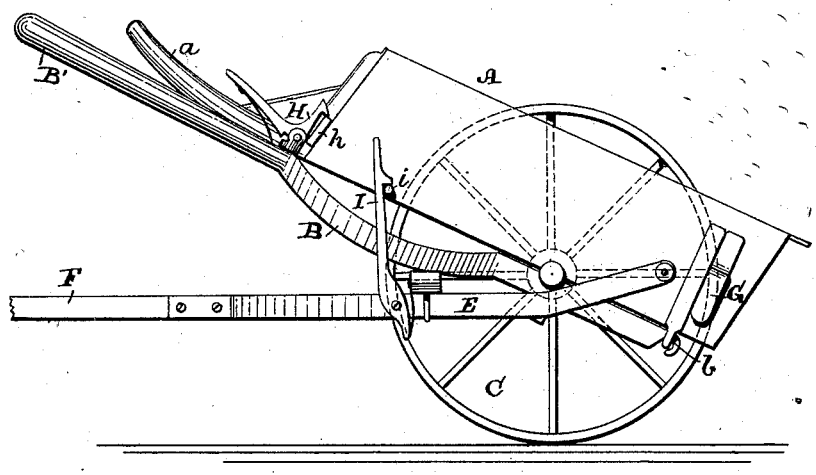

In the accompanying drawing, Figure 1 is a perspective view of a road-scraper embodying my invention. Fig. 2 is a side elevation, the near wheel shown removed.

Referring to the parts by letters, letter A represents an ordinary scraper-box, with handles *a a*. Letter B represents the side bars of a frame, terminated at its rear end in a handle, B'.

The forward ends of the bars B are hinged at *b* to and near the front end of the scraper-box A, and have wheels C connected to them by an axle, D.

E E are the side bars of the draft-frame, their rear ends journaled to the sides of the box A, in rear of the hinges *b* of the frame B, and their forward ends, converging, are connected to the draft-pole F, and stayed by a bar, F'.

Fig. 1 shows the scraper in position for loading, and its forward end down to and in position for filling with dirt as the scraper is drawn forward. To sustain the rear end of the box when it becomes loaded, I place a turned-up lug, G, on each side of the box, a little forward of where the bars E are journaled thereto.

H is an elbow-lever-shaped spring-latch, journaled at its angle to the under side and rear portion of the frame B, in such position that when the frame B is pressed down to raise the front end of the scraper-box, the spring-catch H will engage with a catch, *h*, on the box A, and hold the forward end of the scraper-box clear of the ground for local transportation, with its contained load, the lugs G again aiding in sustaining the box A in a horizontal position.

While the parts are in the relative positions last described, the box A may be unloaded by raising its rear end, and thus bringing its forward end to the ground, so that the draft-animals may turn the box A and frame B over into the positions shown at Fig. 2, and in which positions they will be locked together by a spring-latch, I, which projects upward from one of the bars E, engaging with a catch, *i*, on the side of the box A, and which locks the box to the forward bars E direct.

When the parts are in the positions shown in Fig. 2, the box is in a favorable position for transportation from place to place without a load.

Having thus described my invention, what I claim as new, and desire to secure by Letters Patent, is—

1. In a road-scraper having a rear frame, B, hinged near to the front end of the scraper-box, and provided with wheels C, the draft-bars E, journaled to the box A in rear of the hinged connection of the bars B, substantially as described, and for the purpose specified.

2. In a road-scraper having a rear frame, B, hinged near to the front end of the scraper-box, and provided with wheels C, the draft-bars E and lugs G, arranged to operate with the frames B E and box A, substantially as described, and for the purpose specified.

3. The latch I, pivoted to the frame E, and arranged to operate with the pin *i* on the box A, substantially as and for the purpose specified.

In testimony that I claim the foregoing as my own I affix my signature in presence of two witnesses.

JESSE STUBBS.

Witnesses:
THOMAS MCKEE,
E. L. FIELD.